United States Patent
Sun et al.

(10) Patent No.: US 11,885,869 B2
(45) Date of Patent: Jan. 30, 2024

(54) SMART AUTOMATIC FREQUENCY CONTROL APPARATUS BASED ON DIGITAL CONTROL

(71) Applicant: NUCTECH COMPANY LIMITED, Beijing (CN)

(72) Inventors: Shangmin Sun, Beijing (CN); Yu Hu, Beijing (CN); Sheng Yao, Beijing (CN); Tao Wang, Beijing (CN); Xibin Yin, Beijing (CN)

( * ) Notice: Subject to any disclaimer, the term of this patent is extended or adjusted under 35 U.S.C. 154(b) by 606 days.

(21) Appl. No.: 17/256,851

(22) PCT Filed: Jun. 6, 2019

(86) PCT No.: PCT/CN2019/090365
§ 371 (c)(1),
(2) Date: Dec. 29, 2020

(87) PCT Pub. No.: WO2020/010973
PCT Pub. Date: Jan. 16, 2020

(65) Prior Publication Data
US 2021/0364620 A1 Nov. 25, 2021

(30) Foreign Application Priority Data
Jul. 11, 2018 (CN) .......................... 201810761126.9

(51) Int. Cl.
*G01S 13/38* (2006.01)
*G01S 7/40* (2006.01)
(Continued)

(52) U.S. Cl.
CPC ............ *G01S 13/38* (2013.01); *G01S 7/4004* (2013.01); *G01S 13/347* (2013.01); *G05B 1/00* (2013.01)

(58) Field of Classification Search
CPC ...... H05H 2007/027; H05H 7/02; H05H 9/00; H05H 9/048; H05H 7/00; H05H 7/12
See application file for complete search history.

(56) References Cited

U.S. PATENT DOCUMENTS

| 6,876,261 B2 | 4/2005 | Gumm | |
|---|---|---|---|
| 2008/0211431 A1* | 9/2008 | Mishin | ..................... H05H 7/12 315/505 |

(Continued)

FOREIGN PATENT DOCUMENTS

| CN | 101163371 A | 4/2008 |
|---|---|---|
| CN | 101163372 A | 4/2008 |

(Continued)

OTHER PUBLICATIONS

International Search Report and Written Opinion of the International Searching Authority for International Patent Application No. PCT/CN2019/090365 dated Aug. 27, 2019, 13 pages.

*Primary Examiner* — Monica C King
(74) *Attorney, Agent, or Firm* — Merchant & Gould P.C.

(57) ABSTRACT

The present disclosure provides a smart automatic frequency control (AFC) apparatus, including: a phase shift module, connected to a first signal input terminal and configured to: receive an incident wave from the first signal input terminal, perform a phase shift on the incident wave according to a phase shift parameter so as to generate a phase-shifted signal, and output the phase-shifted signal to a phase detection module; and the phase detection module, connected to the phase shift module and a second signal input terminal and configured to: receive a reflected wave from the second signal input terminal, perform a phase detection on the phase-shifted signal and the reflected wave so as to generate a phase difference signal, and output the phase difference signal via a control interface.

17 Claims, 4 Drawing Sheets

(51) Int. Cl.
    *G01S 13/34*     (2006.01)
    *G05B 1/00*     (2006.01)

(56) References Cited

U.S. PATENT DOCUMENTS

| | | | | |
|---|---|---|---|---|
| 2010/0231144 A1* | 9/2010 | Leek | ............... | H05H 7/00 |
| | | | | 315/39 |
| 2017/0055338 A1* | 2/2017 | Saverskiy | ............... | H05H 7/08 |
| 2019/0387608 A1* | 12/2019 | Saverskiy | ............... | H05G 1/58 |

FOREIGN PATENT DOCUMENTS

| | | |
|---|---|---|
| CN | 101835340 A | 9/2010 |
| CN | 106134453 B | 7/2014 |
| CN | 105092985 A | 11/2015 |
| CN | 208607357 U | 3/2019 |
| IN | 106025786 A | 10/2016 |

* cited by examiner

SMART AUTOMATIC FREQUENCY CONTROL APPARATUS BASED ON DIGITAL CONTROL

CROSS REFERENCE TO RELATED APPLICATIONS

This application is a National Stage Application of PCT/CN2019/090365, filed on Jun. 6, 2019, which claims priority to Chinese Patent Application No. 201810761126.9, filed on Jul. 11, 2018, which are incorporated herein by reference in their entireties.

TECHNICAL FIELD

The present disclosure relates to a field of automatic frequency control, and in particular to a smart automatic frequency control apparatus based on digital control.

BACKGROUND

Automatic Frequency Control (AFC) system, also known as Automatic Frequency Tuner (AFT) system, is an automatic control system to make an output microwave signal frequency of a microwave generator keep a certain relationship with a target frequency.

The AFC system, in a radar system, is mainly used to keep a frequency of a receiver at a set point, so as to ensure that a radar feedback signal is received correctly. In the early 1950s, it began to be used in FM communication receiver to improve anti-interference ability, used in radar receiver to achieve frequency fine-tuning, and also used in FM transmitter and other electronic devices to improve system stability.

In travelling wave or standing wave electron linear accelerator used in modern medical treatment, industry and the like, the AFC system based on microwave signal processing is often used to ensure that the output microwave frequency of the microwave power source matches an operating frequency point of the accelerator tube, so as to ensure the stability of various indicators during the system operation and improve the anti-interference ability.

Implementation of the AFC system used in the standing wave electron linear accelerator is basically divided into three methods: maximum dose control method, minimum reflected wave detection method, and frequency detection method. In the maximum dose control method, a dose rate of the accelerator system is tracked in real time, and a control signal is obtained through a feedback signal, so as to maintain the dose rate of the entire system at the maximum point. Since the measurement signal is an extremely weak current signal, and the measurement is performed in a harsh environment such as high voltage, strong electricity, strong magnetic field, and strong electromagnetic interference, it is difficult to ensure the stability and accuracy of the system. This method is suspended in the theoretical stage. In the minimum reflected wave detection method, the change of the microwave power signal reflected by the accelerator tube is tracked to generate the control signal to control the frequency of the microwave source in the accelerator system, so as to ensure the stability of the dose output and other indicators of the entire system. In the frequency detection method, consistency of the input microwave characteristics and some microwave signal characteristics required by the accelerator tube is detected to obtain the signal for controlling the microwave source, so as to ensure the stability of the dose output and other indicators of the entire system. There are generally four types of frequency control systems: crystal oscillator frequency control system, single-cavity frequency control system, dual-cavity frequency control system, and phase-locked frequency control system.

The crystal oscillator frequency control system is a scheme adopted in the early accelerator system, in which an output frequency of a crystal oscillator is used as a reference for the output frequency control signal of the microwave source. Its disadvantage is that the frequency of the microwave power source can only be stabilized at a specific point, but cannot be dynamically adjusted in real time to keep the system in the best state according to the change of the operating frequency caused by the temperature change of the accelerator tube.

In the single-cavity frequency control system, a single resonant cavity is used, and the purpose of frequency locking is achieved by the characteristic that different frequencies of microwave signal have different output signals after passing through the resonant cavity. Since the cavity is in communication with the system waterway, the signal change generated by the cavity has a certain correlation with the frequency change of the accelerator tube caused by the temperature. However, since the cavity processing accuracy and sensitivity is low, the frequency control ability is insufficient.

In the dual-cavity frequency control system, two resonant cavities respectively with frequencies of $f+\Delta f$ and $f-\Delta f$ are used. The two resonant cavities are excited by the microwave signal of the sampling waveguide. After respective sampling, two signals obtained are converted to a DC level by a peak sampling circuit, and then pass through a differential amplifier to obtain a driving signal to change the frequency of the microwave source. Compared with the single-cavity frequency control system, the dual-cavity frequency control system has a good frequency-change-tracking characteristic, and can achieve a higher system stability. However, its tracking range is limited, and it cannot adapt to large changes.

The phase-locked frequency control system (also called indirect frequency detection AFC system) detects a change of a phase difference between the incident wave and the reflected wave, which is used as a feedback signal to generate a corresponding microwave source control signal to compensate for a frequency point difference value caused by a frequency deviation of each microwave signal, so as to quickly and accurately control the microwave source of the system. Since its successful development in the 1970s, it has been adopted by most standing wave accelerator systems at home and abroad.

Fundamentally speaking, the phase-locked frequency detection AFC system has the characteristics of stable performance and fast response speed. For traditional standing wave linear accelerators, it is the most commonly used system scheme. From the device model selection, it can be seen that the existing AFC control systems mostly use analog microwave signal processing systems, and mechanical rotation is used on the attenuator and phase shifter. Accurate positioning cannot be realized and the device consistency is poor. Moreover, the microwave devices are mostly close to the microwave source system and ray generating device of the accelerator. During the operation, debugger needs to repeatedly turn off the ray system and travel between the safety and ray control areas. There are certain problems in debugging efficiency and safety.

SUMMARY

In view of this, an aspect of the present disclosure provides a smart AFC apparatus, including:

a phase shift module, connected to a first signal input terminal and configured to: receive an incident wave from the first signal input terminal, perform a phase shift on the incident wave according to a phase shift parameter so as to generate a phase-shifted signal, and output the phase-shifted signal to a phase detection module; and the phase detection module, connected to the phase shift module and a second signal input terminal and configured to: receive a reflected wave from the second signal input terminal, perform a phase detection on the phase-shifted signal and the reflected wave so as to generate a phase difference signal, and output the phase difference signal via a control interface.

According to an embodiment of the present disclosure, the phase shift parameter is a digital control signal.

According to an embodiment of the present disclosure, the incident wave is generated by a microwave source, and the reflected wave is generated by a reflection of the incident wave via an electron linear accelerator.

According to an embodiment of the present disclosure, the phase shift module includes:

a digital phase shifter, connected to the first signal input terminal and configured to: receive the incident wave from the first signal input terminal, perform the phase shift on the incident wave according to the phase shift parameter so as to generate a first phase-shifted signal, and output the first phase-shifted signal to a first filter;

the first filter, connected to the digital phase shifter and configured to: filter the first phase-shifted signal to generate a first filtered signal, and output the first filtered signal to a first attenuator;

the first attenuator, connected to the first filter and configured to: attenuate the first filtered signal to generate a first attenuated signal, and output the first attenuated signal to a second filter; and the second filter, connected to the first attenuator and configured to: filter the first attenuated signal to generate a second filtered signal, and output the second filtered signal as the phase-shifted signal to the phase detection module.

According to an embodiment of the present disclosure, the phase shift module further includes a digital switch connected between the first filter and the first attenuator.

According to an embodiment of the present disclosure, the phase detection module includes: an electric bridge, connected to a second filter and the second signal input terminal and configured to: receive the reflected wave from the second signal input terminal, perform the phase detection on the phase-shifted signal and the reflected wave so as to generate the phase difference signal, and output the phase difference signal via the control interface.

According to an embodiment of the present disclosure, the smart AFC apparatus further includes:

a first amplitude control module, connected to the first signal input terminal and configured to: receive the incident wave from the first signal input terminal, adjust an amplitude of the incident wave according to a first amplitude adjustment parameter, and output the adjusted incident wave to the phase shift module.

According to an embodiment of the present disclosure, the first amplitude adjustment parameter is a digital control signal.

According to an embodiment of the present disclosure, the first amplitude control module includes:

a second attenuator, connected to the first signal input terminal and configured to: receive the incident wave from the first signal input terminal, attenuate the incident wave to generate a second attenuated signal, and output the second attenuated signal to an amplitude limiter;

the amplitude limiter, connected to the second attenuator and configured to: limit an amplitude of the second attenuated signal to generate an amplitude-limited signal, and output the amplitude-limited signal to a third attenuator; and the third attenuator, connected to the amplitude limiter and configured to: further attenuate the amplitude-limited signal to generate a third attenuated signal, and output the third attenuated signal to the phase shift module.

According to an embodiment of the present disclosure, the third attenuator includes a digital variable attenuator and a fixed-value attenuator, wherein, the digital variable attenuator is connected to the amplitude limiter and configured to: attenuate the amplitude-limited signal to generate a first temporary attenuated signal, and output the first temporary attenuated signal to the fixed-value attenuator; and the fixed-value attenuator is connected to the digital variable attenuator and configured to: attenuate the first temporary attenuated signal to generate a second temporary attenuated signal, and output the second temporary attenuated signal to the phase shift module.

According to an embodiment of the present disclosure, the second attenuator is a fixed-value attenuator.

According to an embodiment of the present disclosure, the smart AFC apparatus further includes:

a second amplitude control module, connected to the second signal input terminal and configured to: receive the reflected wave from the second signal input terminal, adjust an amplitude of the reflected wave according to a second amplitude adjustment parameter, and output the adjusted reflected wave to the phase detection module.

According to an embodiment of the present disclosure, the second amplitude adjustment parameter is a digital control signal.

According to an embodiment of the present disclosure, the second amplitude control module includes:

a fourth attenuator, connected to the second signal input terminal and configured to: receive the reflected wave from the second signal input terminal, attenuate the reflected wave to generate a fourth attenuated signal, and output the fourth attenuated signal to a third filter; and the third filter, connected to the fourth attenuator and configured to: filter the fourth attenuated signal to generate a third filtered signal, and output the third filtered signal to the phase detection module.

According to an embodiment of the present disclosure, the fourth attenuator includes:

a fixed-value attenuator, connected to the second signal input terminal and configured to: attenuate the reflected wave to generate a third temporary attenuated signal, and output the third temporary attenuated signal to a digital variable attenuator;

the digital variable attenuator, connected to the fixed-value attenuator and configured to: attenuate the third temporary attenuated signal to generate a fourth temporary attenuated signal, and output the fourth temporary attenuated signal to a second fixed-value attenuator; and the second fixed-value attenuator, connected to the digital variable attenuator and configured to: further attenuate the fourth temporary attenuated signal to generate a fifth temporary attenuated signal, and output the fifth temporary attenuated signal to the third filter.

According to an embodiment of the present disclosure, the electric bridge is connected to the second filter and the third filter, and configured to: perform the phase detection on the phase-shifted signal and the third filtered signal so as to generate the phase difference signal, and output the phase difference signal via the control interface.

BRIEF DESCRIPTION OF THE ACCOMPANYING DRAWINGS

The above and other objects, features, and advantages of the present disclosure will be more apparent through the following description of embodiments of the present disclosure with reference to the accompanying drawings, in which.

DETAILED DESCRIPTION

Embodiments of the present disclosure will be described below with reference to the drawings. It should be understood, however, that these descriptions are merely exemplary and are not intended to limit the scope of the present disclosure. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The words "a", "an" and "the" as used herein should also include the meaning of "a plurality of" and "multiple" unless the context clearly indicates otherwise. In addition, the terms "including", "comprising" and the like indicate the presence of features, steps, operations, and/or components, but do not exclude the presence or addition of one or more other features, steps, operations, or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

Figure 1A:
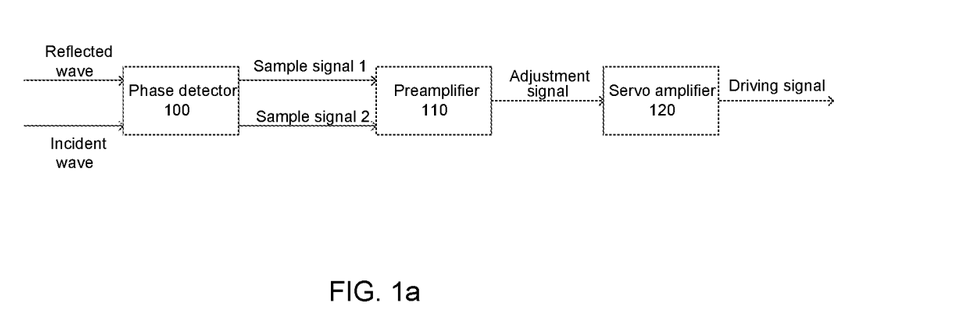
FIG. 1a shows a structural diagram of a phase-locked AFC system according to the prior art.

FIG. 1a shows a structural diagram of a phase-locked AFC system according to the prior art. The phase-locked AFC system is mainly composed of a phase detector 100, a preamplifier 110 and a servo amplifier 120. Both the incident wave and the reflected wave are input to the phase detector 100. The incident wave is an electrical signal obtained by obtaining the microwave signal fed into the interior of the standing wave accelerator tube between a magnetron and an isolator (or between the accelerator tube and the isolator) and sampling the microwave signal. The reflected wave is an electrical signal obtained by obtaining the microwave signal reflected by the standing wave accelerator tube between a heavy load and the isolator (or between the accelerator tube and the isolator) and sampling the microwave signal. The phase detector 100 performs a phase conversion of the incident wave and the reflected wave by operations such as amplitude adjustment, phase shifting, and superposition vector calculation on the incident wave and the reflected wave in a time domain, so as to obtain two microwave signals having vector sums and vector differences, and then samples the two microwave signals to obtain the electrical signals.

Figure 1B:
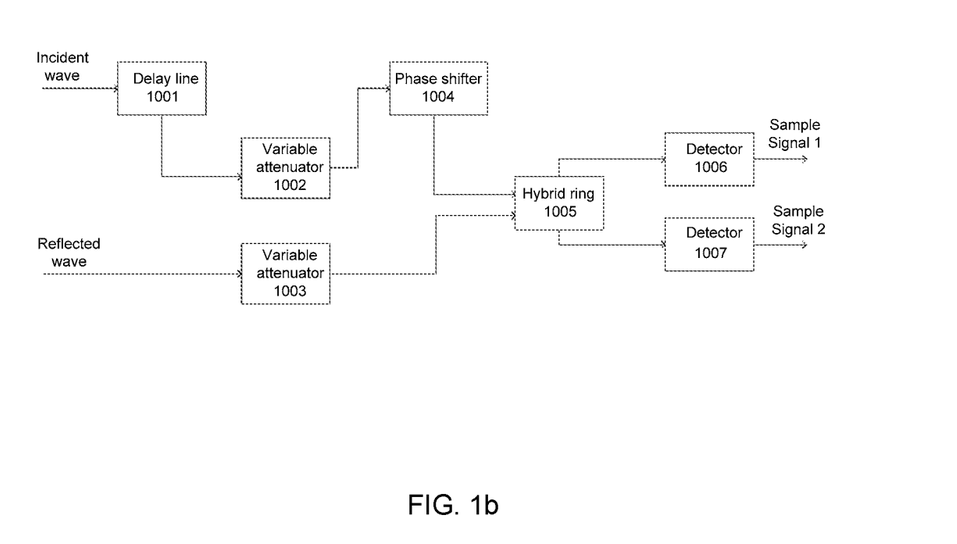
FIG. 1b shows a structural diagram of a phase detector in the phase-locked AFC system shown in FIG. 1a according to the prior art.

FIG. 1b shows a structural diagram of the phase detector 100 in the phase-locked AFC system shown in FIG. 1a according to the prior art. The phase detector 100 is mainly composed of a delay line 1001, a variable attenuator 1002, 1003, a phase shifter 1004, a hybrid ring 1005, and detectors 1006 and 1007.

In a common accelerator system, the phase shifter, the hybrid ring and the detector are usually integrated to form an AFT unit, such as the AFT unit manufactured by AFT Microwave in Germany. The AFT unit is an integrated device in which comprehensive functions such as phase shifter, hybrid ring and detector crystal are integrated through microstrip technology. A phase shift adjustment knob is adjusted mechanically, and sometimes a DC motor may be used for electronic control and adjustment.

Core components in the AFC system also include variable attenuator, phase shifter, hybrid ring and detector crystal.

The variable attenuator mainly attenuates an amplitude of the microwave sample signal to a certain range, so that it is convenient for the back end to perform calculation and processing. Among the existing products, the variable attenuator mainly includes mechanical continuous-variable attenuator, mechanical step-variable attenuator, digital variable attenuator and voltage-controlled variable attenuator. The mechanical continuous-variable attenuator is often used in the existing AFC system.

The phase shifter moves the microwave signal in time and phase, and tries to keep the amplitude and signal details unchanged. The phase shifter includes a mechanical phase shifter which usually uses a knob to linearly adjust the phase of the phase shift, and a digital phase shifter which usually uses a multi-bit digital control to step-adjust the phase of the phase shift.

The hybrid ring (also called a microwave hybrid ring) calculates the vector difference and vector sum of the two microwave signals through the microstrip structure and microwave transmission characteristics, so as to obtain two new microwave signals.

The detector crystal is a detector device that converts pulsed microwave signal into the electrical signal.

Figure 2:
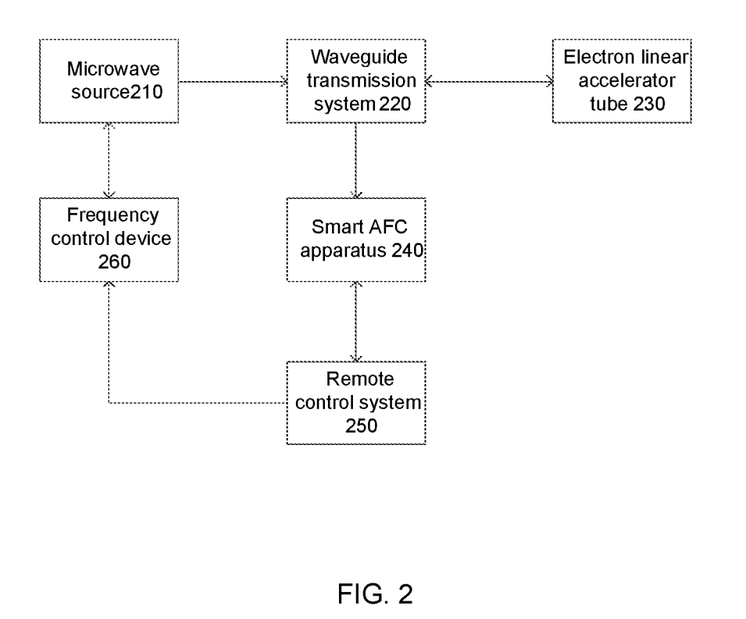
FIG. 2 shows a structural diagram of a smart AFC system according to an embodiment of the present disclosure.

FIG. 2 shows a structural diagram of a smart AFC system according to an embodiment of the present disclosure. The smart AFC system may include a microwave source 210, a waveguide transmission system 220, an electronic linear accelerator tube 230, a smart AFC apparatus 240, a remote control system 250, and a frequency control device 260.

The microwave source 210 is a device that generates pulsed microwave power by using pulsed high voltage power. In the field of electron linear accelerators, the microwave source 210 is usually realized by a magnetron, a klystron, and the like The microwave source 210 may generate the microwave signal. The microwave source 210 generally has the ability to adjust the frequency of the output microwave signal within a certain range. The adjustment method of the microwave signal frequency usually includes mechanical rotation, electric pulse stepping, digital adjustment of excitation source frequency, and so on.

The waveguide transmission system 220 may transmit the microwave signal to the electron linear accelerator tube 230 and the smart AFC apparatus. When the waveguide transmission system 220 transmits the microwave signal to the electron linear accelerator tube 230, an accelerating electric field may be generated in the electron linear accelerator tube 230. Part of the accelerating electric field is reflected back to the waveguide transmission system 220. A directional coupler is employed to sample at the front end of the isolator or at the microwave inlet of the accelerator tube so as to obtain the incident wave signal. A sampling waveguide is employed to sample the microwave signal at the incident wave so as to obtain an incident wave electric signal. A directional coupler is employed to conduct directional sampling of the reflected wave at an absorption load of the isolator or at the microwave inlet of the accelerator tube so as to obtain a reflected wave electrical signal. The waveguide transmission system 220 may transmit the reflected wave to the smart AFC apparatus 240.

The smart AFC apparatus 240 may generate a phase difference signal according to the input incident wave and reflected wave, and output the phase difference signal to the remote control system 250. The remote control system 250 may compare the input phase difference signal with a preset phase difference signal to generate an adjustment signal, and transmit the adjustment signal to the frequency control device 260. The frequency control device 260 may perform power amplification processing on the input adjustment signal to generate a frequency tuning control signal, and transmit the frequency tuning control signal to the microwave source 210. The microwave source 210 may change the frequency of the generated microwave signal according to the frequency tuning control signal. The microwave source 210 may change the frequency of the microwave signal digitally or mechanically. In order to adjust the frequency of the microwave signal, the microwave source generally linearly adjusts the frequency of the microwave signal with a mechanical rotating structure, such as a frequency adjustment mechanism of the magnetron. Some microwave sources use the excitation source type amplification principle. For example, a klystron microwave source excites the frequency with an excitation source which is controlled by a digital signal or a voltage analog signal to control the output microwave frequency. In addition, the microwave source 210 may also generate an adjustment threshold feedback signal according to the frequency tuning control signal, and transmit the adjustment threshold feedback signal back to the frequency control device 260.

In this way, the entire smart AFC system forms a closed-loop control and realizes automatic tracking of microwaves. The remote control system transforms the mechanical control of the traditional design into a digital control signal through a control program, which can remotely realize the change of the attenuation value of the microwave signal, the phase control of the signal, and the digital processing of the signal. It is also possible to adopt PLC or circuit system to provide analog signal with controllable voltage to realize signal control.

Figure 3:
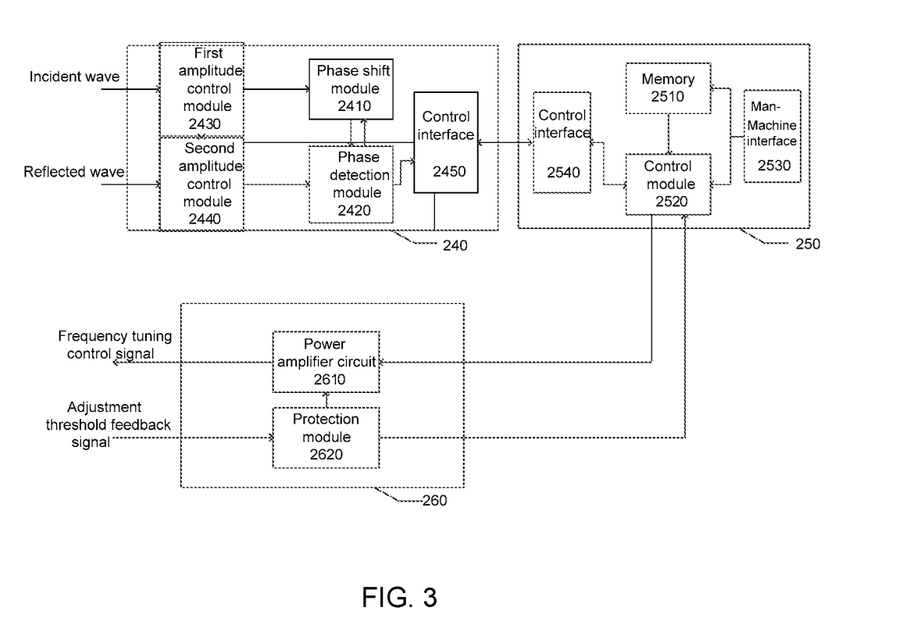
FIG. 3 shows a structural diagram of a smart AFC apparatus, a remote control system and a frequency control device in the smart AFC system shown in FIG. 2 according to an embodiment of the present disclosure.

The structural diagram of the smart AFC apparatus 240, the remote control system 250 and the frequency control device 260 in the smart AFC system shown in FIG. 2 according to the embodiment of the present disclosure will be described below in detail with reference to FIG. 3.

The smart AFC apparatus 240 may include a phase shift module 2410 and a phase detection module 2420. The phase shift module 2410 may be connected to a first signal input terminal and configured to: receive the incident wave from the first signal input terminal, perform a phase shift on the incident wave according to the phase shift parameter received from the remote control system 250 via the control interface 2450 so as to generate a phase shift signal, and output the phase shift signal to the phase detection module 2420. The phase shift parameter usually adopts an analog signal of rad/mV, and of course, can also adopt a digital control signal of multiple-bit digits such as 12 bit or 16 bit. The phase detection module 2420 may be connected to the phase shift module 2410 and a second signal input terminal and configured to: receive the reflected wave from the second signal input terminal, perform a phase detection on the phase-shifted signal and the reflected wave so as to generate a phase difference signal, and output the phase difference signal to the remote control system 250 via the control interface 2450. Here, the incident wave may be generated by the microwave source, and the reflected wave may be generated by the reflection of the incident wave via the electron linear accelerator tube. The phase detection module 2420 may also be implemented with a high-frequency frequency mixing chip, or with a low-frequency digital phase detection chip after frequency division of the signal.

Here, only the case of performing the phase shift on the incident wave is described. According to the specific implementation, in addition to the phase shift of the incident wave, the phase shift may also be performed on the reflected wave. That is, a multi-path phase shift method is used to perform a phase adjustment so that the back-end phase detection module is available or operates at the best operating point.

The smart AFC apparatus 240 may also optionally include a first amplitude control module 2430 and a second amplitude control module 2440, depending on the implementation mode of the phase shift module 2410 and the phase detection module 2420. When the phase shift module 2410 is implemented with a wide-amplitude IC chip, the smart AFC apparatus 240 may not include the first amplitude control module 2430. When the phase detection module 2420 is implemented with a wide-amplitude IC chip, the smart AFC apparatus 240 may not include the second amplitude control module 2440. The first amplitude control module 2430 may be connected to the first signal input terminal and configured to: receive the incident wave from the first signal input terminal, adjust an amplitude of the incident wave according to a first amplitude adjustment parameter received from the remote control system 250 via the control interface 2450, and output the adjusted incident wave to the phase shift module 2410. The second amplitude control module 2440 may be connected to the second signal input terminal and configured to: receive the reflected wave from the second signal input terminal, adjust an amplitude of the reflected wave according to a second amplitude adjustment parameter received from the remote control system 250 via the control interface 2450, and output the adjusted reflected wave to the phase detection module 2420. Here, the first amplitude adjustment parameter may be equal to the second amplitude adjustment parameter, and the first and second amplitude adjustment parameters may be digital/analog control signals. The control interface 2450 may adopt a dedicated MCU single-chip microcomputer or a serial port controller to transmit the control signal between systems after digitizing the control signal. The control signal may also be transmitted with the PLC PROFINET protocol or network cable. It is also possible to partially or entirely adopt voltage analog signals to ensure system stability.

The remote control system 250 may include a memory 2510, a control module 2520, a man-machine interface 2530, and a control interface 2540. The memory 2510 stores a state signal of the digital chip, such as the first amplitude adjustment parameter, the second amplitude adjustment parameter, the phase shift parameter, the initial phase difference compensation signal, the initial position signal, the preset phase difference signal, and so on. It is possible to write programs for responding to feedback signal, making logical action, receiving signal from control personnel, and system startup/pause through the changes of the optimal microwave frequency point of the system caused by external conditions such as temperature and beam intensity, and store the programs in the control module 2520. The program writing process may be implemented on PC side, on remotely controlled FPGA, or on remotely controlled PLC. The control module 2520 may be connected to the memory 2510 and configured to: receive the phase difference signal from the phase detection module 2420 via the control interface 2540, compare the received phase difference signal with the preset phase difference signal stored in the memory 2510, generate the adjustment signal according to a comparison result, and transmit the adjustment signal to the frequency control device 260. The control interface 2540 may adopt a dedicated MCU single-chip microcomputer or a serial port controller to transmit the control signal between systems after digitizing the control signal. The control signal may also be transmitted with the PLC PROFINET protocol or network cable. It is also possible to partially or entirely adopt voltage analog signals to ensure system stability. The man-machine interface 2530 may be connected to the memory 2510 and the control module 2520, and may be configured to display the system status to the operator and receive the system command of the operator on the remote control terminal such as the display screen, touch screen and button interface through graphics, text, logos, etc. It should be noted that the control module 2520 and the control interface 2540 may also be implemented in the frequency control device 260, and the input of the control signal and the feedback of the state are realized by the PC/PLC terminal.

The frequency control device 260 may include a power amplifier circuit 2610 and a protection module 2620. The power amplifier circuit 2610 receives the adjustment signal, and power-amplifies the adjustment signal to generate the frequency tuning control signal. In order to enable the power amplifier circuit 2610 to convert the phase difference signal into a driving signal or a voltage control signal for operating the mechanical structure, the power amplifier circuit 2610 also needs to be connected to a drive power supply (such as a DC/AC power supply). The protection module 2620 may receive the adjustment threshold feedback signal from the microwave source 210. The adjustment threshold feedback signal may include a disconnection indication signal indicating whether the frequency tuning control signal exceeds an adjustable range for the microwave source 210. The protection module 2620 may determine whether a disconnection signal should be transmitted to the power amplifier circuit 2610 according to the disconnection indication signal, so that the power amplifier circuit 2610 no longer processes the adjustment signal and no longer outputs the frequency tuning control signal. In addition, the adjustment threshold feedback signal may also include, for example, the initial position signal of the microwave source 210. The protection module 2620 may transmit the initial position signal to the memory 2510 via the control module 2520 so as to be stored in the memory 2510. The protection module 2620 determines the position and restriction status of the frequency adjustment mechanism by reading the mechanical and electronic signals of the frequency adjustment mechanism in the microwave source 210, and uses mechanical or electronic protection mechanism to avoid damage to the frequency adjustment mechanism or internal structure of the microwave source. In addition, the protection module 2620 implements auxiliary functions such as initialization of the initial position by reading the relative or absolute position.

Figure 4A:
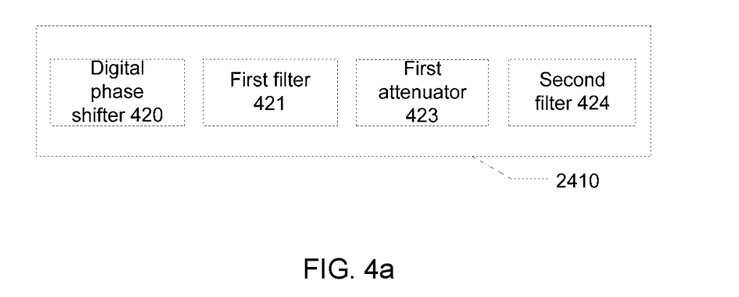
FIGS. 4a to 4c schematically show a structural diagram of each module in the smart AFC apparatus shown in FIG. 3 according to an embodiment of the present disclosure.
Figure 4B:
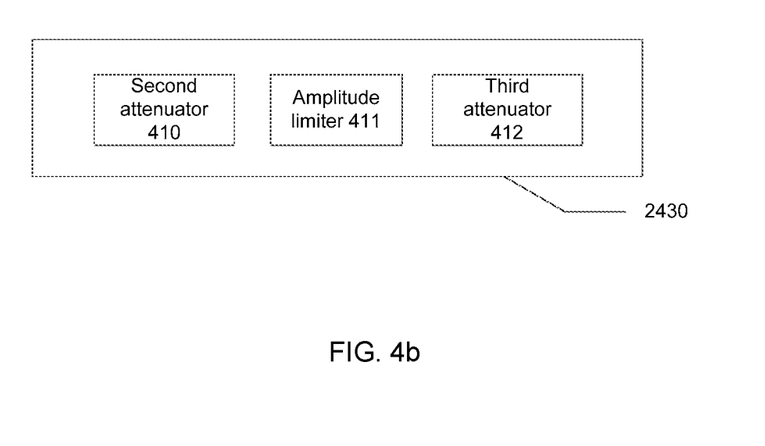
Figure 4C:
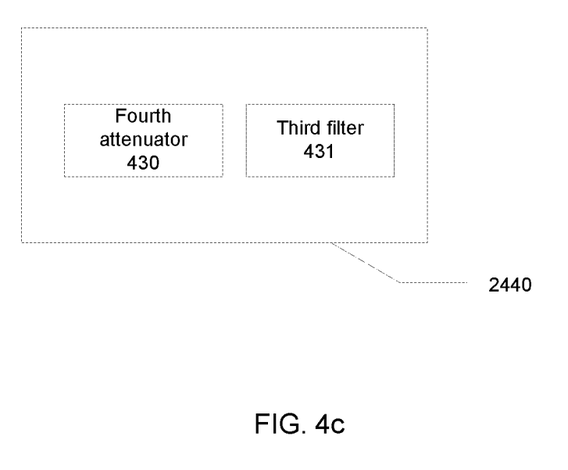

FIGS. 4a to 4c schematically show a structural diagram of each module in the smart AFC apparatus shown in FIG. 3 according to an embodiment of the present disclosure.

The phase shift module 2410 may include: a digital phase shifter, connected to the first signal input terminal and configured to: receive the incident wave from the first signal input terminal, perform the phase shift on the incident wave according to the phase shift parameter so as to generate a first phase-shifted signal, and output the first phase-shifted signal to a first filter; a first filter 421, connected to the digital phase shifter 420 and configured to: filter the first phase-shifted signal to generate a first filtered signal, and output the first filtered signal to a first attenuator; a first attenuator 422, connected to the first filter 421 and configured to: attenuate the first filtered signal to generate a first attenuated signal, and output the first attenuated signal to a second filter; and a second filter 423, connected to the first attenuator 422 and configured to: filter the first attenuated signal to generate a second filtered signal, and output the second filtered signal as the phase-shifted signal to the phase detection module.

The phase shift module 2410 may further include a digital switch connected between the first filter 421 and the first attenuator 423.

The phase detection module 2420 may include: an electric bridge, connected to the second filter 424 and the second signal input terminal and configured to: receive the reflected wave from the second signal input terminal, perform the phase detection on the phase-shifted signal and the reflected wave so as to generate a phase difference signal, and output the phase difference signal via the control interface 2450.

The first amplitude control module 2430 may include: a second attenuator 410, connected to the first signal input terminal and configured to: receive the incident wave from the first signal input terminal, attenuate the incident wave to generate a second attenuated signal, and output the second attenuated signal to an amplitude limiter; the amplitude limiter 411, connected to the second attenuator 410 and configured to: limit an amplitude of the second attenuated signal to generate an amplitude-limited signal, and output the amplitude-limited signal to a third attenuator; and the third attenuator 412, connected to the amplitude limiter 411 and configured to: further attenuate the amplitude-limited signal to generate a third attenuated signal, and output the third attenuated signal to the phase shift module.

The second attenuator 410 may be a fixed-value attenuator. The third attenuator 412 may include a digital variable attenuator and a fixed-value attenuator, wherein the digital variable attenuator may be connected to the amplitude limiter 411 and configured to: attenuate the amplitude-limited signal to generate a first temporary attenuated signal, and output the first temporary attenuated signal to the fixed-value attenuator; and wherein the fixed-value attenuator is connected to the digital variable attenuator and configured to: attenuate the first temporary attenuated signal to generate a second temporary attenuated signal, and output the second temporary attenuated signal to the phase shift module 2410.

The second amplitude control module 2440 may include: a fourth attenuator 430, connected to the second signal input terminal and configured to: receive the reflected wave from the second signal input terminal, attenuate the reflected wave to generate a fourth attenuated signal, and output the fourth attenuated signal to a third filter 431; and the third filter 431, connected to the fourth attenuator 430 and configured to: filter the fourth attenuated signal to generate a third filtered signal, and output the third filtered signal to the phase detection module 2420.

The fourth attenuator 430 may include: a fixed-value attenuator, connected to the second signal input terminal and configured to: attenuate the reflected wave to generate a third temporary attenuated signal, and output the third temporary attenuated signal to a digital variable attenuator; the digital variable attenuator, connected to the fixed-value attenuator and configured to: attenuate the third temporary attenuated signal to generate a fourth temporary attenuated signal, and output the fourth temporary attenuated signal to a second fixed-value attenuator; and the second fixed-value attenuator, connected to the digital variable attenuator and configured to: further attenuate the fourth temporary attenuated signal to generate a fifth temporary attenuated signal, and output the fifth temporary attenuated signal to the third filter.

In an alternative embodiment, the electric bridge may be connected to the second filter 424 and the third filter 431 and configured to: perform the phase detection on the phase-shifted signal and the third filtered signal so as to generate the phase difference signal, and output the phase difference signal via the control interface 2450.

The technical solution according to the embodiments of the present disclosure is designed and modified in terms of signal processing, control logic as well as device scale and system integration, which changes the AFC system from the traditional mechanical control mode to the digital control mode, and improves the ease of use. It greatly reduces the complexity of the system by integrating the original multi-discrete devices into a digital-chip-controlled system. It can realize the remote debugging of the operator, reduce the difficulty of debugging and use, improve the cycle of production links, and improve system ease of use. From the perspective of cost, the cost of the newly adopted chip has been significantly reduced compared with the cost of the original discrete devices, and the product failure rate and maintenance cost has also been reduced, which has a significant economic benefits.

The foregoing methods, devices, units and/or modules according to various embodiments of the present disclosure may be implemented by an electronic device with computing capability executing software containing computer instructions. The system may include a storage device to realize the various storage described above. The electronic device with computing capability may include a general-purpose processor, a digital signal processor, a special-purpose processor, a reconfigurable processor, and other devices capable of executing computer instructions, but is not limited thereto. Execution of such instructions causes the electronic device to perform the above-mentioned operations according to the present disclosure. The aforementioned devices and/or modules may be implemented in one electronic device or in different electronic devices. The software may be stored in a computer-readable storage medium. The computer-readable storage medium stores one or more programs (software modules). The one or more programs include instructions that when executed by one or more processors in the electronic device, cause the electronic device to perform the method of the present disclosure.

These software may be stored in a volatile memory or non-volatile storage device such as storage devices like ROM, whether it is erasable or rewritable, or stored in a memory such as RAM, memory chip, device or integrated circuit, or stored on an optically readable medium or a magnetically readable medium such as CD, DVD, magnetic disk or tape, etc. It should be appreciated that the storage device and storage medium are examples of a machine-readable storage device suitable for storing one or more programs including instructions that, when executed, used to implement the embodiments of the present disclosure. The embodiments provide programs and a machine-readable storage device storing such programs. The programs include codes for implementing the device or method according to any one of the claims of the present disclosure. In addition, these programs may be transmitted electronically via any medium (for example, a communication signal carried via a wired connection or a wireless connection), and various embodiments appropriately include these programs.

The methods, devices, units and/or modules according to various embodiments of the present disclosure may also be implemented as a hardware, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by an appropriate combination of the three implementation modes of software, hardware and firmware. The system may include a storage device to realize the storage described above. When implemented in these ways, the software, hardware, and/or firmware used are programmed or designed to perform the corresponding above-mentioned methods, steps and/or functions according to the present disclosure. Those skilled in the art may appropriately implement one or more of these systems and modules, or a part or more of them using different implementations described above according to actual needs. These implementations all fall into the protection scope of the present disclosure.

Although the present disclosure has been shown and described with reference to specific exemplary embodiments of the present disclosure, those skilled in the art should understand that without departing from the spirit and scope of the present disclosure defined by the appended claims and their equivalents, various variations in form and details may be made to the present disclosure. Therefore, the scope of the present disclosure should not be limited to the above-mentioned embodiments, but should be defined by the appended claims and their equivalents.

The invention claimed is:

1. A smart Automatic Frequency Control "AFC" apparatus, comprising:
   a phase shift module, connected to a first signal input terminal and configured to: receive an incident wave from the first signal input terminal, perform a phase shift on the incident wave according to a phase shift parameter so as to generate a phase-shifted signal, and output the phase-shifted signal to a phase detection module; and
   the phase detection module, connected to the phase shift module and a second signal input terminal and configured to: receive a reflected wave from the second signal input terminal, perform a phase detection on the phase-shifted signal and the reflected wave so as to generate a phase difference signal, and output the phase difference signal via a control interface.

2. The smart AFC apparatus according to claim 1, wherein the phase shift parameter is a digital control signal.

3. The smart AFC apparatus according to claim 1, wherein the incident wave is generated by a microwave source, and the reflected wave is generated by a reflection of the incident wave via an electron linear accelerator.

4. The smart AFC apparatus according to claim 1, wherein the phase shift module comprises:
   a digital phase shifter, connected to the first signal input terminal and configured to:
   receive the incident wave from the first signal input terminal, perform the phase shift on the incident wave according to the phase shift parameter so as to generate a first phase-shifted signal, and output the first phase-shifted signal to a first filter;
   the first filter, connected to the digital phase shifter and configured to: filter the first phase-shifted signal to generate a first filtered signal, and output the first filtered signal to a first attenuator;
   the first attenuator, connected to the first filter and configured to: attenuate the first filtered signal to generate a first attenuated signal, and output the first attenuated signal to a second filter; and
   the second filter, connected to the first attenuator and configured to: filter the first attenuated signal to generate a second filtered signal, and output the second filtered signal as the phase-shifted signal to the phase detection module.

5. The smart AFC apparatus according to claim 1, wherein the phase shift module further comprises a digital switch connected between a first filter and a first attenuator.

6. The smart AFC apparatus according to claim 1, wherein the phase detection module comprises: an electric bridge, connected to a second filter and the second signal input terminal and configured to: receive the reflected wave from the second signal input terminal, perform the phase detection on the phase-shifted signal and the reflected wave so as to generate the phase difference signal, and output the phase difference signal via the control interface.

7. The smart AFC apparatus according to claim 1, further comprising:
   a first amplitude control module, connected to the first signal input terminal and configured to: receive the incident wave from the first signal input terminal, adjust an amplitude of the incident wave according to a first amplitude adjustment parameter, and output the adjusted incident wave to the phase shift module.

8. The smart AFC apparatus according to claim 7, wherein the first amplitude adjustment parameter is a digital control signal.

9. The smart AFC apparatus according to claim 7, wherein the first amplitude control module comprises:
   a second attenuator, connected to the first signal input terminal and configured to: receive the incident wave from the first signal input terminal, attenuate the incident wave to generate a second attenuated signal, and output the second attenuated signal to an amplitude limiter;
   the amplitude limiter, connected to the second attenuator and configured to: limit an amplitude of the second attenuated signal to generate an amplitude-limited signal, and output the amplitude-limited signal to a third attenuator; and
   the third attenuator, connected to the amplitude limiter and configured to: further attenuate the amplitude-limited signal to generate a third attenuated signal, and output the third attenuated signal to the phase shift module.

10. The smart AFC apparatus according to claim 9, wherein the third attenuator comprises a digital variable attenuator and a fixed-value attenuator, and wherein
    the digital variable attenuator is connected to the amplitude limiter and configured to: attenuate the amplitude-limited signal to generate a first temporary attenuated signal, and output the first temporary attenuated signal to the fixed-value attenuator; and
    the fixed-value attenuator is connected to the digital variable attenuator and configured to: attenuate the first temporary attenuated signal to generate a second temporary attenuated signal, and output the second temporary attenuated signal to the phase shift module.

11. The smart AFC apparatus according to claim 9, wherein the second attenuator is a fixed-value attenuator.

12. The smart AFC apparatus according to claim 1, further comprising:
    a second amplitude control module, connected to the second signal input terminal and configured to: receive the reflected wave from the second signal input terminal, adjust an amplitude of the reflected wave according to a second amplitude adjustment parameter, and output the adjusted reflected wave to the phase detection module.

13. The smart AFC apparatus according to claim 12, wherein the second amplitude adjustment parameter is a digital control signal.

14. The smart AFC apparatus according to claim 4, wherein the second amplitude control module comprises:
    a fourth attenuator, connected to the second signal input terminal and configured to: receive the reflected wave from the second signal input terminal, attenuate the reflected wave to generate a fourth attenuated signal, and output the fourth attenuated signal to a third filter; and
    the third filter, connected to the fourth attenuator and configured to: filter the fourth attenuated signal to generate a third filtered signal, and output the third filtered signal to the phase detection module.

15. The smart AFC apparatus according to claim 14, wherein the fourth attenuator comprises:
    a fixed-value attenuator, connected to the second signal input terminal and configured to: attenuate the reflected wave to generate a third temporary attenuated signal, and output the third temporary attenuated signal to a digital variable attenuator;
    the digital variable attenuator, connected to the fixed-value attenuator and configured to: attenuate the third temporary attenuated signal to generate a fourth temporary attenuated signal, and output the fourth temporary attenuated signal to a second fixed-value attenuator; and
    the second fixed-value attenuator, connected to the digital variable attenuator and configured to: further attenuate the fourth temporary attenuated signal to generate a fifth temporary attenuated signal, and output the fifth temporary attenuated signal to the third filter.

16. The smart AFC apparatus according to claim 14, wherein the electric bridge is connected to the second filter and the third filter, and is configured to: perform the phase detection on the phase-shifted signal and the third filtered signal so as to generate the phase difference signal, and output the phase difference signal via the control interface.

17. The smart AFC apparatus according to claim 7, further comprising:
    a second amplitude control module, connected to the second signal input terminal and configured to: receive the reflected wave from the second signal input terminal, adjust the amplitude of the reflected wave according to a second amplitude adjustment parameter, and output the adjusted reflected wave to the phase detection module.

* * * * *